United States Patent

Ferris et al.

[15] 3,653,621

[45] Apr. 4, 1972

[54] SNUBBING ARRANGEMENT FOR COLLAPSIBLE TRAILER HITCH

[72] Inventors: Ray L. Ferris, Thornton, Ill.; Walter J. Marulic, Gary, Ind.

[73] Assignee: Pullman Incorporated, Chicago, Ill.

[22] Filed: Oct. 6, 1969

[21] Appl. No.: 864,059

[52] U.S. Cl. ....................................................248/119 S
[51] Int. Cl. ............................................................B60p 7/00
[58] Field of Search ..............................248/119 S; 16/84.66; 105/368 S

[56] References Cited

UNITED STATES PATENTS

| 890,207 | 6/1908 | Anderson | 16/84 |
| 2,585,413 | 2/1952 | Simpson | 16/66 |
| 3,035,801 | 5/1962 | Mangels | 248/119 S |
| 3,168,878 | 2/1965 | Clejan | 105/368 S |
| 3,279,731 | 10/1966 | Rollins | 248/119 S |

Primary Examiner—Edward C. Allen
Attorney—Hilmond O. Vogel and Wayne Morris Russell

[57] ABSTRACT

A trailer hitch for securing highway trailers on the flat deck of a railway car is provided with an improved snubbing device for cushioning the hitch when it collapses from an operative to an inoperative position. The snubbing device comprises a hydraulic unit which is connected to the upright strut and which is operative only during the collapse of the strut to a horizontal position on the deck. The hydraulic snubbing device and connection to the strut is so arranged as to provide an initial free fall of the strut to a certain point after which the snubbing device acts to retard the speed of falling movement of the strut, up to a point prior to full collapse whereupon the snubbing device again becomes inoperative and permits the free fall of the strut to its collapsed position.

3 Claims, 5 Drawing Figures

PATENTED APR 4 1972 3,653,621

Inventors
Ray L. Ferris
Walter J. Marulic
By *Helmund O. Vogt*
Attorney

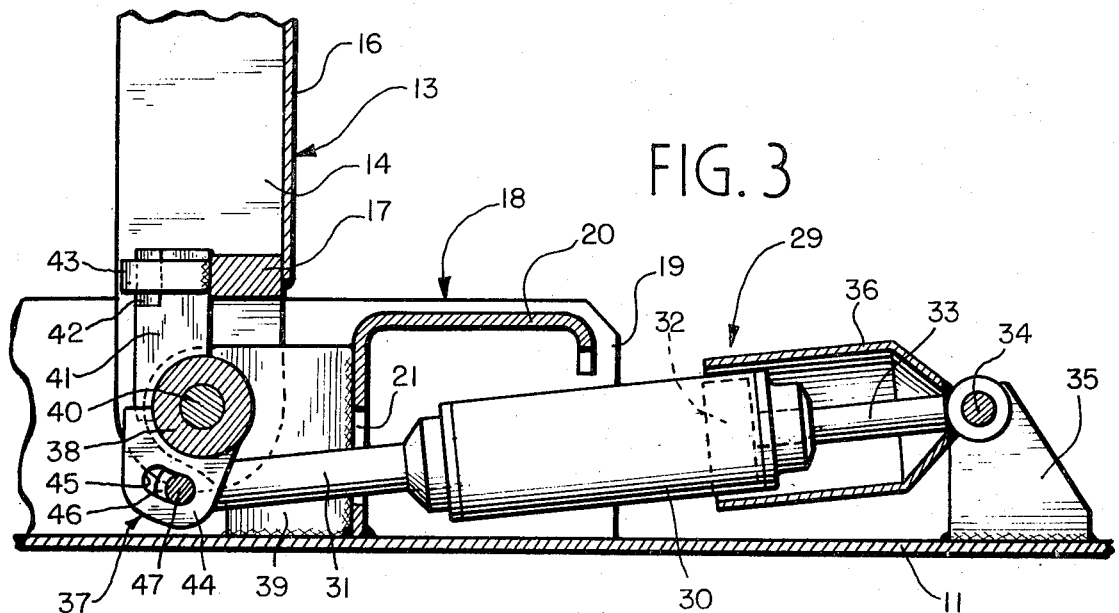
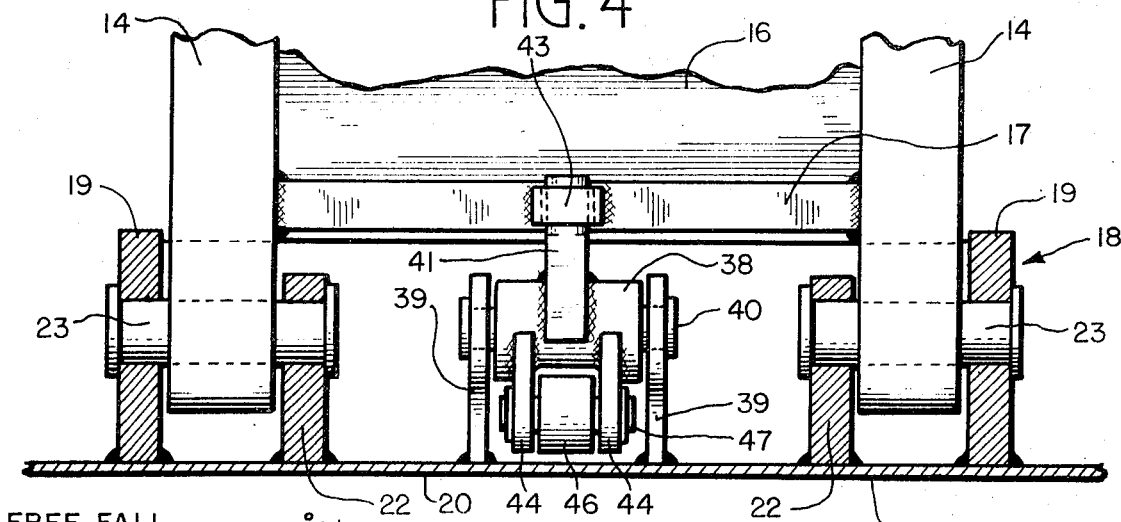
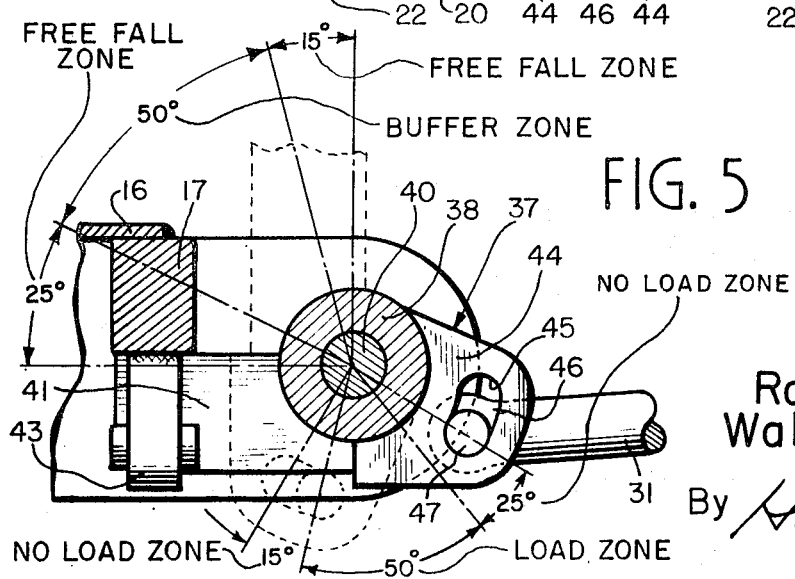

SNUBBING ARRANGEMENT FOR COLLAPSIBLE TRAILER HITCH

SUMMARY

The present invention is concerned with a trailer hitch of the type disclosed in the H. S. Wille et al., U.S. Pat. No. 3,358,955, patented Dec. 19, 1967. The type of trailer hitch therein disclosed is raised from a collapsed position to a vertical operative position by means of a tractor which is provided with a suitable connection attached to the trailer hitch, and whereupon movement of the tractor the hitch is elevated to the operative position. The trailer hitch is also adapted to be raised by a suitable winch or crane. When it is desired to move the hitch to a collapsed position the tractor may be moved into engagement with the hitch which thereupon is knocked down to its inoperative or collapsed position. It is recognized that the knocking down of the hitch may cause damage to the deck of the car or the hitch itself and therefore various snubbing devices have been developed to cushion the fall of the hitch. Such a device is shown in the aforementioned patent as well as in U.S. Pat. Nos. 3,183,854, 3,183,853, 3,087,748 and 3,362,653. The snubbing device of the present invention is connected to the strut by a suitable force-transmitting means which becomes effective, during collapse, after the strut has moved to a certain point whereafter the snubbing device retards the speed of falling movement of the strut until a point is reached somewhat prior to the full collapse of the strut. At this point the snubbing device again becomes ineffective and the remaining free fall of the strut is such that it is firmly and fully collapsed in its inoperative position. It is therefore the object of this invention to provide an improved snubbing device which will protect the hitch and deck as the hitch falls by gravity and yet is arranged to control the falling action so that effective and positive collapse is achieved.

BRIEF DESCRIPTION OF THE DRAWINGS

FIG. 3 is a cross-sectional view taken substantially along the line 3—3 of FIG. 2;

FIG. 4 is a cross-sectional view taken substantially along the line 4—4 of FIG. 2; and FIG. 5 is a cross-sectional view similar to FIG. 3 showing a collapsed position of a trailer hitch strut.

DETAILED DESCRIPTION

Figure 1:
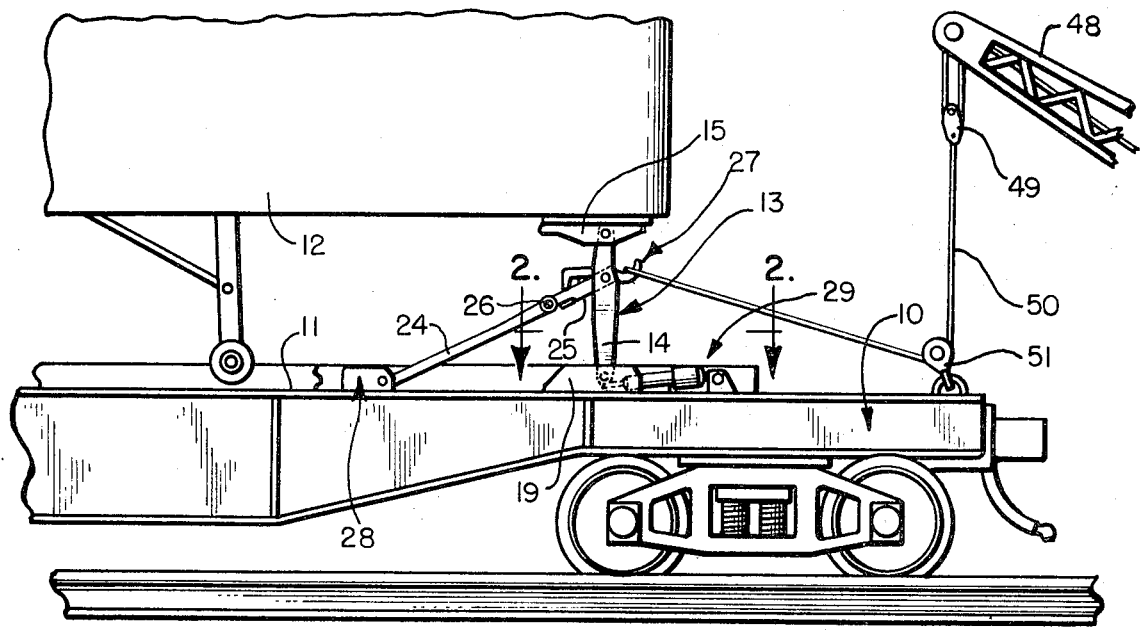
FIG. 1 is a side elevational view of a portion of a railway car having a trailer secured thereon by means of a trailer hitch having an improved snubbing device.
Figure 2:
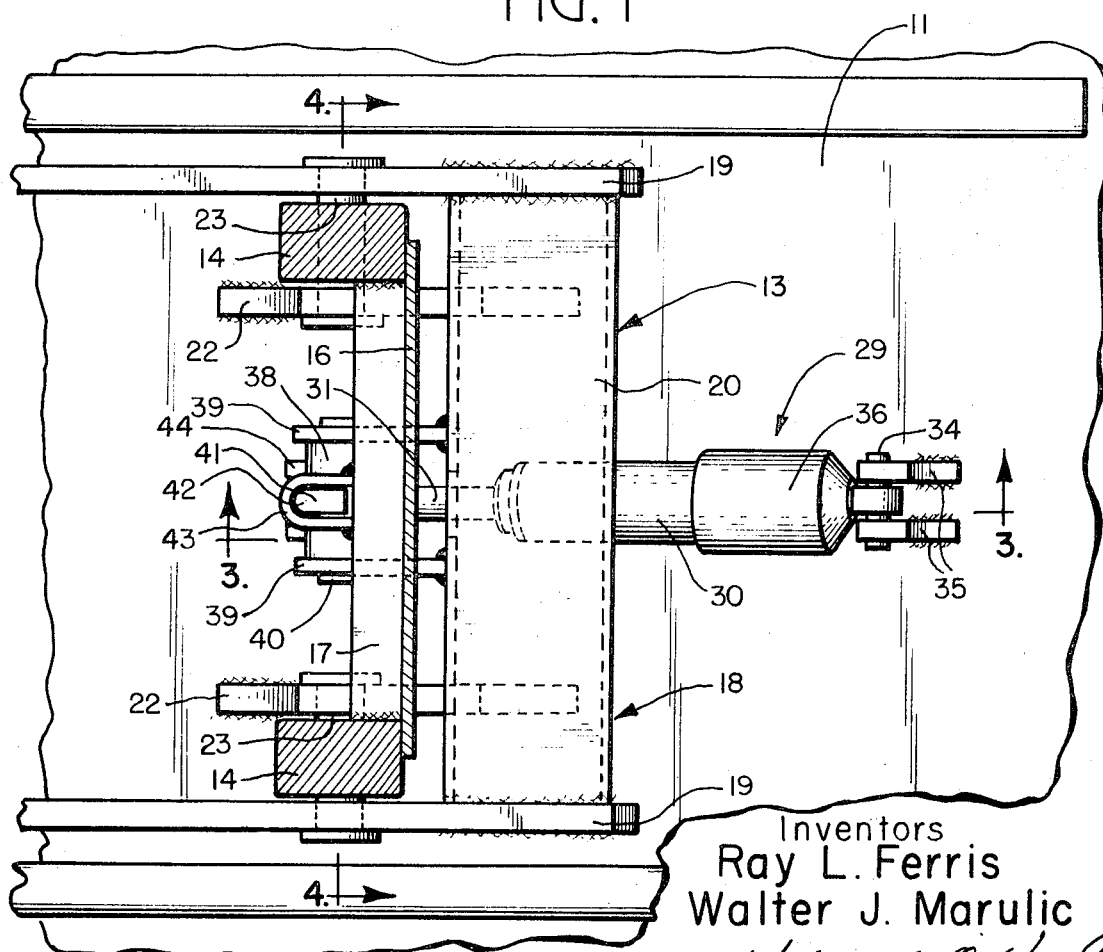
FIG. 2 is a cross-sectional view taken substantially along the line 2—2 of FIG. 1.

FIG. 1 discloses a railway car 10 having a deck 11. The car 10 is of a conventional construction particularly adapted for TOFC (Trailer on Flat Car) operations with a highway trailer 12 supported thereon by means of a trailer hitch 13. The trailer hitch 13 is more fully described in the aforementioned Wille et al., patent and essentially comprises a pair of upright struts 14 which pivotally support at their upper ends a top plate 15 which includes a suitable locking means for engaging the kingpin of the trailer to securely anchor the trailer. The upright struts 14 are connected by means of a transverse vertical plate 16 provided at its lower end with a transverse bar 17.

The upright struts 14 are pivotally connected to a bracket structure on the deck generally designated at 18. The bracket structure 18 comprises a pair of horizontally extending transversely spaced plates 19 suitably connected by a transverse angle-shaped member 20. The member 20 also is provided with an opening 21, best shown in FIG. 3. The bracket structure 18 also includes a pair of pivot brackets 22 which by means of pivot pins 23 also supported on the plates 19 pivotally support the lower ends of the struts 14.

The hitch 13 also includes a pair of diagonal strut members 24 and 25 shown linearly connnected by suitable pivot means 26. A release mechanism 27 is provided to maintain the struts 24 and 25 in a linear position during the operative position of the hitch 13 as best shown in FIG. 1. As more fully described in the Wille patent, the release mechanism 27 secures the hitch in the operative position and also upon actuation thereof permits the relative folding of the struts 24 and 25 whereby the hitch can be collapsed to a horizontal position on the deck 11. As shown in FIG. 1, the strut 24 may be suitably connected to a cushioning arrangement generally designated at 28 and more fully described in the aforementioned patent.

A snubbing device 29 positioned on the deck 11 includes a hydraulic cylinder 30 having projecting therefrom at one end a connecting rod 31. The cylinder 30 includes a piston 32 adapted to reciprocate in the cylinder and is connected to a piston rod 33 pivotally connected at 34 to a pair of brackets 35 suitably supported on the deck 11. A shielding housing 36 is provided at one end of the cylinder 30 to protect the piston rod 33 and associated seals, etc. which form part of a conventional hydraulic snubbing unit. A force transmitting means 37 includes a sleeve 38 journalled on brackets 39 by means of a pivot pin 40. A connector element 41, as best shown in FIG. 3, is rigidly connected to the sleeve 38 and is provided at one end with a curved portion 42 which complements the arcuate section of a U-shaped clip 43 secured to the transverse bar 17. A pair of arms 44 project downwardly from the sleeve 38 and have provided therein transversely aligned elongated slots 45 providing a lost motion connection. The connector rod 31 is provided with a bored head 46 having a transverse pivot pin 47 slidingly engaged in the elongated slot 45.

As best shown in FIG. 1, a crane 48 positioned near the railway car 10 may include a winch 49 and a cable 50 which is trained about an idler pully 51 secured on the railway car and the said cable 50 having its end suitably connected to the trailer hitch for raising the trailer hitch from a lowered to a raised position.

THE OPERATION

The operation of the trailer hitch 13 is fully described in the aforementioned Wille patent. Such hitches 13 may be raised in the manner indicated by the crane 48 and cable 50 arrangement to the position shown in FIG. 1 where the struts 14 are locked in the upright position. The raising operation also in many instances is accomplished by means of a tractor which is provided with a suitable hook engageable with the hitch for pulling the same to its raised position. In tractor operation the tractor also functions to engage the release mechanism 27 to release the hitch and thereby move the same to a collapsed position. Either the tractor or the crane may be employed. When a crane is employed for pulling up the hitch, the hitch also may be lowered by the operator tripping the mechanism 27 with a suitable tool such as a crowbar and the hitch will fall to its collapsed position.

During TOFC operation the railway car may receive impacts resulting from coupling of one car to another. During such impacts the cushioning device 28 permits rocking or swinging of the struts 14 thereby protecting lading carried within the trailer 12 as more fully disclosed in the aforesaid Wille patent.

The snubbing device 29 is provided for controlling the fall of the struts 14 to their collapsed position. A hitch of the type disclosed is extremely heavy and upon collapse causes a large impact on the deck of the car. Also, the possibility exists that parts of the hitch may be damaged during the fall. Therefore, it is desired to restrain or delay the momentum or speed of the fall to such an extent that damage is avoided while at the same time a complete collapse of the hitch is necessary so that it will not present an obstruction to tractors and trailers driven over the cars during loading and unloading.

The snubber 29 functions to control the momentum or speed of fall of the struts 14. In the position shown in FIG. 3, the struts 14 are operative in relation to the trailer 12 and upon release the struts 14 are moved to the position shown in FIG. 5. As the tractor knocks down the hitch 13 by motive power the release mechanism 27 permits the struts to move in a counterclockwise direction about the pivot pins 23. For the first 15° of fall the snubber 29 is inactive since the elongated slots 45 provide a lost motion connection relative to the pin 47. This is the free fall zone described in FIG. 5. At the predetermined point of 15° the pin 47 reaches the end of the slot 45, and continued movement of the arms 44 in a counterclockwise position causes the connecting rod 31 and cylinder 30 to move to the right in FIG. 3 whereupon the piston 32 reacts upon the fluid within the cylinder 30 to cushion or slow down the fall of the hitch 13 to the collapsed position. This snubbing or restraining control on the momentum of fall occurs for approximately 50° at which time the snubber device 29 ceases to function as such.

The snubbing device 29 includes suitable valve means, etc., permitting fluid to travel from one side of the piston within the cylinder to the other side. It is believed unnecessary to describe the hydraulic unit in more detail since it is of conventional construction. The snubbing action in the last 25° of fall is accomplished by putting a groove longitudinally in the cylinder wall which is wider toward the end that is adjacent the lost motion connection and narrower at the end toward the piston so that when the piston moves from the narrow section of the cylinder groove to the wider section of the cylinder groove the hydraulic fluid can be dumped more rapidly behind the piston for rapid descent of the stanchion in the last 25° of fall, such widening of the cylinder groove being conventional for varying the rate of expulsion of the fluid from the pressure side to the non-pressure side of the cylinder.

FIG. 5 shows the movement of the arms 44 to the various positions as the struts 14 are collapsed. At the end of the 50° zone additional travel of 25° of said arms provides no movement of the cylinder 30 and thus this is a no-load zone, or free fall of the struts 14, during the last 25° of rotation. Thus essentially these struts have a 15° free fall zone initially and a buffer or snubbing zone of 50° after which point the snubber becomes inactive and a 25° free fall zone is provided. Thus release of the hitch is initially achieved, snubbing action is obtained and the free fall just prior to complete collapse permits positive collapse of the hitch on the deck of the car.

What is claimed:

1. In a trailer hitch having an articulated diagonal strut pivotally connecting with the deck of a railroad car and having an upright strut pivotally connecting with the diagonal strut and with the deck, said upright strut including anchoring means thereon adapted to releasably support a trailer on said car, said upright strut being releasable from an upright operative position to pivotally move by gravity with the diagonal strut to a collapsed, down, inoperative position on said deck;

a snubbing arrangement mounted on the deck on the side of the hitch opposite the direction of the fall of the struts to the deck for controlling the rate of descent of said struts during only part of their downward movement comprising:

a first portion anchored to the deck, a second portion relatively movable with respect to the first portion and having a free end part, force absorbing means comprising a fluid containing cylinder and a piston reciprocally disposed within said cylinder and acting on the fluid, said cylinder being connected to one of said first and second portions and said piston being connected to the other of said first and second portions, and means to disable said force absorbing means, said force absorbing means being operative during an initial portion of the movement of said second portion relative to said first portion and disabled during the remainder of said movement, and force transmitting means connecting said free end part to said upright strut for applying a force on said second portion only after said upright strut moves approximately 10° to 20° towards its collapsed position whereby said force absorbing means controls the speed of movement of said struts, said force transmitting means comprising a pivot member mounted on said deck for rotational movement in the direction of collapsing of said struts, a first arm extending upwardly from said pivot member and connecting with said upright strut, the rotational movement of the first arm causing rotational angular movement of the upright strut into its line of fall, a second arm extending downward from said pivot member and having an enlarged slot receiving the free end part of said second portion, said free end part being smaller than the slot thereby providing a lost motion connection with the upright strut for a downward angular movement of approximately 10° to 20° of said upright strut whereafter said second arm positively engages said free end part whereby the free falling weight of the struts acts upon said snubbing arrangement which in turn retards the rate of descent of said struts during only the next approximately 40° to 60° of said collapsing movement after which said upright strut moves at least the final 5° to its collapsed position free of control from the snubbing arrangement and solely due to gravitational forces.

2. The invention according to claim 1, wherein the axis of rotation of the pivotal connection of said upright strut to the deck is generally in alignment with the axis of rotation of the pivot force transmitting member.

3. The invention according to claim 2, further comprising a clevis member on said upright strut engaged by said first arm of the force transmitting member whereby rotational movement of the force transmitting member and the upright strut results in general concurrent rotation of the upright strut and force transmitting member subsequent to the lost motion connection action between the free end of the second portion and said slot.

* * * * *